Nov. 9, 1948.  J. W. KARWEIT  2,453,135

CHIP BREAKING DRILL DEVICE

Filed Nov. 20, 1942

INVENTOR.
John W. Karweit
BY
HIS ATTORNEY

Patented Nov. 9, 1948

2,453,135

UNITED STATES PATENT OFFICE 2,453,135

CHIP BREAKING DRILL DEVICE

John W. Karweit, Skokie, Ill., assignor, by mesne assignments, to Ex-Cell-O Corporation, Detroit, Mich., a corporation of Michigan Application November 20, 1942, Serial No. 466,273

11 Claims. (Cl. 77—5)

The present invention relates to the art of drilling and more particularly to twist drilling and to the drilling of elastomers and plastics, as well as metal having stringy characteristics, without the encumbrances of long stringy chips.

In many respects the present invention is an improvement upon the invention set forth in my co-pending application, Serial No. 455,417, filed August 20, 1942, reference to which is hereby made to the extent that a further understanding of the present invention may be pertinent it being understood that the word "stringy," used herein, is in keeping with machine shop parlance to identify material that is string-like in character, which chips occur with a material ductile enough that a shaving such as a chip progressively cut from the material does not break under the cutting strain imposed upon it by a cutting edge fed into the material.

It is well known that in drilling holes in the conventional manner in an elastomer or plastic, great care has to be exercised to avoid exceeding the capacity of the flutes in the drill to store cuttings made upon any particular feed traverse of the drill into the work. If the storage capacity is exceeded, or, if a long curly chip becomes impacted in the flutes, the scoring and friction between the wall of the bore and the chip carried by the drill will cause such friction and heat as to melt or liquefy the chip and/or the wall. If the chip is melted it adheres to the drill and clogs the flutes. The operator must then take time out either to clear the flutes or replace the drill. Furthermore, once the scoring action has begun the upper limits of the score blocks the lower portions of the cut the same as a plug and thereby prevents any cooling fluid reaching the inner limits of the cut.

Furthermore, to those familiar with the drilling of an elastomer, such as a semi-soft or soft rubber out of which bottle corks and vibration dampeners are made, the hole left by a twist drill is greatly undersize and the walls of the bore are very shabby. This is due to the fact that in the conventional process the non-circular cross-section of the drill permits the rubber to yield inwardly as the flutes pass and to stretch outwardly to permit the ribs of the drill to pass. Under these circumstances the hole never is up to the diameter of the drill and the walls are scuffed and unsatisfactory.

Because of these difficulties it has been the conventional practice to perforate elastomers either by coring a mold if one hole only is used, or by punching the hole or extra holes with a hollow punch. In the latter instance, obviously the diameter of the hole varies from one end to the other due to the resiliency of the rubber and the action of the material under pressure.

In the present invention instead of maintaining a sustained feed force upon a drill that induces the rubber to yield downwardly and away from the point of the drill, the drill is automatically lifted a few thousandths of an inch distance from the bottom of the hole each time a predetermined cut is made. This lifts the chip from the body and with the assistance of the leading edge of the ribs the chip is cut or broken away from the body in small enough pieces to clear the flutes. By lifting the chips before they are broken the action thus provided permits the rubber to return to its resting position ahead of the drill and the next cut is the same full cut as all the preceding cuts, thereby providing a uniform diameter throughout the stock.

When drilling rubber, however, other than that commonly known as hard rubber, a comparatively fast drill rotation has been found to be desirable. Speeds upwardly of 1,700 R. P. M. had been found to be desirable. The exact speed depends, of course, upon the peripheral speed of the drill surface in the work which in turn is related directly to the size of the drill. A small drill is revolved much faster than a large drill, and the 1,700 R. P. M. mentioned would probably be the optimum minimum for a drill ⅜" in diameter, such as a standard drill, high spiral drills permitting faster speeds.

A further advantage with the present invention resides in the fact that the drill upon entering the work piece, such as made of an elastomer or plastic, does not cause a crater-like burr around the mouth of the cut nor does it leave a burr around the edge of the cut when the drill cuts through the opposite wall of the work piece as is the case with the conventional drilling of such materials as those mentioned.

A further object of the invention is to provide a new and improved apparatus for providing a good wall finish in drilled passageways, which finish is free from scores caused by chips in the drill flutes.

A further purpose of the present invention is found in the provision of means for making a hole in the rubber stock by a twist drill in which the diameter of the hole is substantially the same size as that of the drill.

A further object of the invention is to provide an improved apparatus for deep hole drilling, a wide range of materials including elastomers, thermoplastics, stringy metals, wood and ferrous metals.

A further object of the invention is to provide an improved continuous forward feed for twist drills in deep hole drilling especially.

Another object of the invention is to provide an improved apparatus in which the drill will run true without danger of lateral movement under the oscillation or feed motion imparted thereto.

These being among the objects of the invention, other and further objects and advantages will become apparent from the drawing, the description relating thereto and the appended claims.

Referring now to the drawing.

As mentioned in my co-pending application, in the practice of the invention the drill is preferably reciprocated axially just enough to break the chips once every revolution of the drill. Although the timing of the reciprocation may be varied for every second or third relative revolution if desired, as by rotating the work or otherwise, the question of whether or not this is done for any particular design will depend a great deal upon the size of the chip that can be cleared by the flutes considering the metal being machined, and upon the number of cutting edges upon the drill. It is preferred that the cuts made by the cutting edges overlap between reciprocations.

The reciprocation mentioned takes place while the continuous feed traverse is being maintained, either by hand or automatically, it being intended that the size of the chips be small enough to be sure to clear the flutes. Then with the vibration set up in the drill by the reciprocations, the chips are constantly agitated in a manner preventing binding and the agitation operates also to lift the chips out of the flutes.

Figure 1:
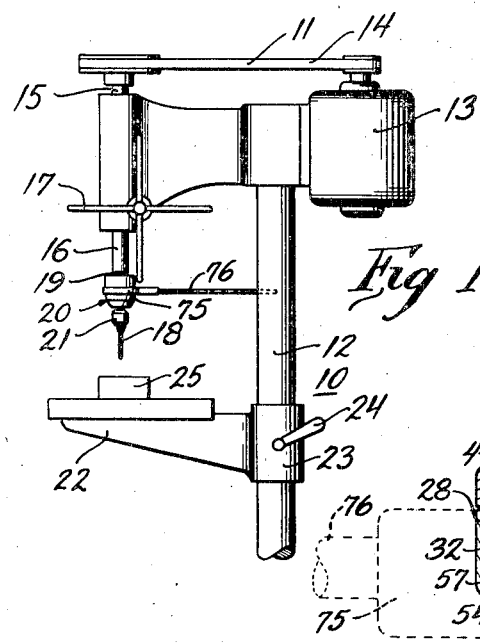
Fig. 1 is a side elevational view of a hand feed drill press upon the quill spindle of which is mounted a preferred embodiment of the invention.

Referring now to the drawing in further details, the invention illustrated in Fig. 1 is shown as installed upon a drill press 10 having a casing 11 mounted on a standard 12 where, upon one side thereof, the casing carries a motor 13 which drives through a V-belt 14, a spindle 15 journalled in the casing 11 on the other side of the standard 12. A quill 16 is reciprocably mounted in the casing 11 for feed and return movements of the drill 18 and is controlled by the manual throw 17. A quill spindle 19 is carried by the quill. The embodiment of the invention is shown at 20 as supported upon the bottom of the quill spindle 19 and is driven from the drive spindle 15 through the quill spindle 19. At its lower end, the embodiment supports a drill chuck 21 which receives the drill 18.

Below the drill 18 a table 22 is adjustably mounted on the standard 12 by means of a split collar 23 and a lock nut 24, with a work piece 25 shown as supported upon the table in position to be operated upon by the drill 18 when the drill is fed downwardly by the manual throw 17.

Figure 2:
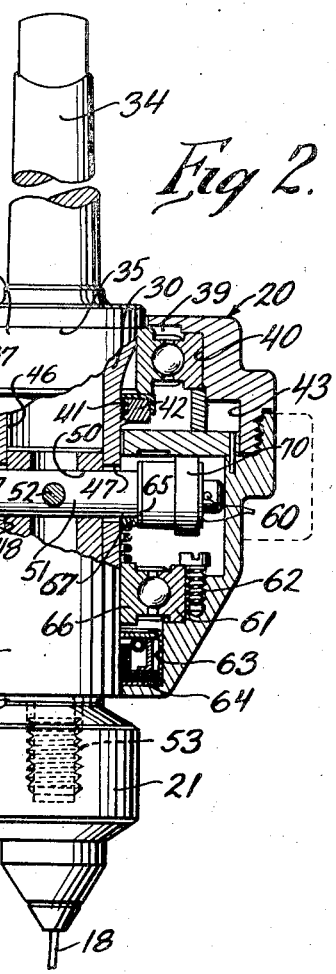
Fig. 2 is an enlarged vertical section of the device shown in Fig. 1 as dismantled from the drill press shown in Fig. 1.

In Fig. 2, the device is shown in sectional detail. A housing comprising an upper part 26 and a lower part 27 threaded together as at 28, encases the working parts which include a drive shaft 30, a driven shaft 31 telescoping into the drive shaft 30 for mutual alignment, a cam 32, and a follower device 33 for the cam.

The drive shaft can be constructed in either one of three ways. The upper end may have an internally tapered opening which receives a male taper upon the quill spindle, which relationship is commonly known as a standard end taper for inserted shanks, or the upper end, as shown in Fig. 2, may be provided with a male shank 34 adapted to be received in a female tapered opening in the quill spindle in the manner commonly known as the Morse taper joint, or the third way, the commonly known thread for a Jacobs chuck.

Figure 3:
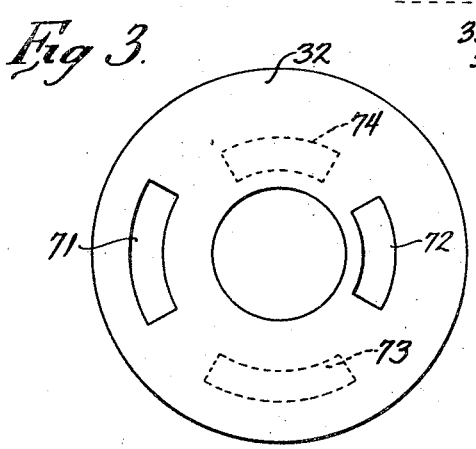
Fig. 3 is a plan view of the cam employed and shown in section in the embodiment shown in Fig. 2.
Figure 4:
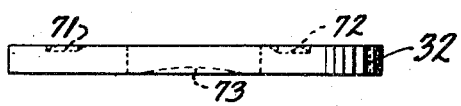
Fig. 4 is a side elevational view of the cam shown in Fig. 3.

The drive shaft is shouldered as at 35 with a reduced portion 36 upon which is received the inner race 37 of a frictionless bearing, the outer race 38 of which is received in a recess 40 with the hollow 39 of the upper member 26. Beyond the reduced portion 36 the drive member is threaded as at 41 to receive a nut 42 to hold the inner race 37 tightly in place upon the drive member. The upper member is enlarged as at 43 to receive the cam member 32 which comprises a circular washer-like disk as shown in Fig. 3, which disk will be described in further detail a little later. Between the cam member 32 and the outer race 38 a spacer 44 is provided by which the thrust upon the cam is carried on the outer race 38 through the upper member 26 of the housing 20.

The lower end 45 of the drive member 30 is provided with an axial bore 46 therein and longitudinally disposed slots 47 through the wall thereof that are located diametrically opposite each other.

The upper end of the driven shaft 31 is ground to a cylindrical outer contour 48 and provided with openings 50 receiving the transverse shaft 51 therein that is held in place by a pin 52. The bore 46 on the drive member is also ground to a close clearance to receive the cylindrical portion of the driven member 31 in a closely fitted reciprocal relationship. The shaft 51 is disposed in the slots 47 which are provided with sufficient length to permit substantial relative axial movement between the drive and driven members.

At its lower end the driven shaft 31 is threaded as indicated at 53 to receive the shuck 21, such as a Jacobs chuck, in which is mounted the drill 18.

From the description thus far, it will be seen that as the shank 34 is rotated by the quill spindle 19, rotation is imparted to the driven member 31 through the shaft 51 and pin 52 with the driven member also axially reciprocable in the bore 46.

The ends of the shaft 51 are reduced in diameter as at 54 to receive a washer 55 against a shoulder 56 and also needle bearings 57 that support a roller follower 58 in position to cooperate with the cam 32. The needle bearings and rollers are held in place by a pin and washer assembly 60.

The lower end 45 of the drive shaft 30 is journalled with respect to the lower member 33 by a frictionless bearing 61 held in place by lock screws 62. In a recess 63 below the frictionless bearing 61 a conventional grease seal 64 of a well known type is installed to prevent the escape of grease from inside of the housing 20.

A spring 65 is disposed between the inner race 66 of the frictionless bearing 61 and a washer 67 that rests against the shaft 51. The spring 65 is a compression spring and acts to hold the driven shaft 31 in its upper position and to maintain contact between the cam follower rollers 58 and the cam member 32.

It will be noted that the cam follower rollers are identical, preferably for inventory purposes, and at one end thereof they are provided with an enlarged or tread portion 70 so that the tracks defined by the treads of both rollers are spaced radially from each other upon the cam surface. As viewed in Fig. 2, the tread 70 upon the roller at the right follows the greater circle, while the tread upon the roller at the left follows a circular path of smaller diameter.

Referring now to Fig. 3, the path on the cam followed by the tread 70 of the right hand roller includes a depression 71, while the path of smaller diameter includes a depression 72 which depressions are disposed diametrically opposite each other in the face of the cam. These depressions 71 and 72 are of the same depth and of the same angular length so that when the tread of one roller rolls into its respective depression the tread of the other roller rolls into its respective depression simultaneously, thereby maintaining a balanced effort and cam action upon opposite sides of the drive and driven members.

The balancing of the cam effort upon both sides of the drive and driven members and the provision of a telescoping relationship upon ground surfaces provides for a true running drill and long life under any and all working conditions within the expected operation of the embodiment.

It will also be observed in connection with Fig. 3, that the dotted lines 73 and 74 are shown which correspond in plan view with the depressions 71 and 72. The lines 73 and 74 indicate like cams upon the opposite side of the cam member 32, the depressions upon the opposite faces of the cam member being different only in the depth to which the depression is ground. Thus with fine drills or light feeds or high speeds of rotation of the drill the shallower pair of the two cam surfaces may be disposed downwardly to cooperate with the treads on the follower rollers, whereas with larger drills, slower feeds or slower rotation, the pair of deeper depressions may be disposed to cooperate with the follower rollers. In this connection it will be appreciated that any number of interchangeable cam members can be provided so that a series of cam depressions of various depths or lengths is available in the operation of the embodiment described.

In order to maintain the housing 20 stationary, a C clamp ring 75 is secured to the housing and provided with an outrigger arm 76 adapted to engage and slide up and down the support 12 during the feed movement of the drill 18. In this way the cam is held against rotation while the rollers rotate with the drive and driven members. It will be appreciated that this relationship can be reversed by mounting the rollers 58 upon bearings secured to the housing and permitting the cam to rotate. However, in the particular construction shown, the use of the shaft 51 provides a double result of supporting the rollers and also linking the drive and driven members in drive relationship.

With the invention thus described, it is possible to drill 20 diameters or more without retracting the drill from the work. The feed is continuous, and a coolant can be used if desired. If used with such materials as elastomers and plastics having a low melting point, the fluid also assists in floating the chips up through the flutes as well as assuring cool cutting conditions. It is important to note that with a chip of a size small enough to clear the flutes there is little danger of the chips becoming impacted in the flutes and damming the cooling fluid from the lower portions of the cut. Therefore, the cooling fluid is able to flow down the flutes and reach the end of the tip without danger of being cut off and without danger of frictional conditions arising that would cause a scoring of the wall of the cut.

Comparatively speaking, it is also of interest to note that the cam depth should be such in the apparatus shown that any particular drill working at its best feed rate will be lifted enough to break the chip that it is cutting while that feed rate is being maintained. The more shallow cams will be used with the smaller drills and the deeper cams will be used with the larger drill sizes. In this connection, without giving extensive tables, the criterion used is to determine the best feed rate for any drill in any particular material and then select the cam which will assure the breaking of the chip without excessive drop or vibration. For instance, if a number 15 drill is being used in a material with a feed rate of .015 of an inch per revolution, the cam depth should be approximately .015 of an inch since this will assure the retraction of the drill sufficient to break the chip because a small fraction of the .015 of an inch feed is lost during that angle of rotation when the cam is in operation. The optimum cam depth for any given drill is one which will break the chip clean between successive cuts. In connection with rubber this cam is a little greater, having in mind the elasticity of the rubber and with elastomers and plastics the cam depth is also generally greater than that used with metal, as described in my co-pending application. Any increase in cam depth to assure the breaking of such material, creates a slight additional vibration factor which is favorable in assisting to clear the flutes of the chips. Because of this, the tolerances are wider and safer upon the side having a cam depth greater than that needed.

Thus, it will be apparent to those skilled in the art that various changes and combinations of the parts can be made without departing from the spirit of the invention, the scope of which is commensurate with the appended claims.

The claims of the present application cover a species subordinate to the subject matter disclosed and claimed in my co-pending application Serial No. 484,612, filed April 26, 1943.

What is claimed is:

1. A combination driller and chip breaker including a non-rotary member, a drive shaft and a driven shaft rotatably mounted with respect to said member and reciprocally mounted with respect to one another, a cam means supported upon said member and having concentric tracks each provided with a single relief therein, a follower means cooperating with said cam means and including a rotor for each cam track, said rotors having raised treads thereon for engaging the cam tracks, said cam means and follower means carrying the axial thrust load between the shafts incurred during the feed traverse thereof, means urging said cam means and follower means in continuous contact with each other, said cam means, follower means and urging means imparting a reciprocation to the driven shaft once each rotation of the driven shaft which reciprocation is accomplished within approximately 60° of rotation, and means upon said driven shaft for supporting a metal cutting drill in work engaging position, said reciprocation comminuting the chips formed by the drill.

2. A device for drilling machinable material comprising, in combination, a supporting member adapted to be mounted for cutting feed movement and to be constrained against rotation, a driven shaft member disposed on an axis projecting through said supporting member and adapted to be connected for rotary power drive and for limited independent axial movement relative to said supporting member, said shaft member being adapted to support a fluted drill at one end in coaxial relation thereto and for rotary and axial movement therewith, and relatively revoluble coacting cam and cam follower elements for normally sustaining said shaft member against the axial drilling thrust, one of said elements being carried by said supporting member in fixed axial position relative thereto, the other of said elements being supported from said shaft member in opposed relation to said one element, and being operatively connected to said shaft member for rotary drive therefrom, said cam element defining a circular track extending concentrically about said axis and formed with alternating dwell and relief areas, said follower element comprising a roller having a diametrically enlarged tread contacting and relatively movable along said track, said elements being operable by reason of said dwell and relief areas at least once during each relative revolution therebetween and each time within a minor portion of said revolution, to effect an axial reciprocation of said shaft member with respect to said supporting member out of normal position comprising first a relief stroke followed by a return stroke through a small fraction of an inch to effect termination of a chip being formed by the drill when cutting.

3. A device according to claim 2 in which said cam element has plurality of circular tracks extending concentrically about said shaft member and each formed with alternating dwell and relief areas, and said follower element comprising a plurality of rollers each with a diametrically enlarged tread respectively in rolling contact with said tracks.

4. A device for drilling machinable material comprising, in combination, a supporting member adapted to be mounted for cutting feed movement and to be constrained against rotation, a driven shaft member disposed on an axis projecting through said supporting member and adapted to be connected for rotary power drive and for limited independent axial movement relative to said supporting member, said shaft member being adapted to support a fluted drill at one end in coaxial relation thereto and for rotary and axial movement therewith, and relatively revoluble coacting cam and cam follower elements for normally sustaining said shaft member against the axial drilling thrust, the cam element comprising an overhead circular end face cam carried by said supporting member in fixed axial position relative thereto and defining two inner and outer concentric cam tracks extending concentrically about said axis and each track formed with alternating dwell and relief areas, the follower element being supported from and operatively connected for rotary drive to said shaft member and comprising a diametrical shaft extending through said shaft member for movement therewith, two rollers journalled on opposite ends of said diametrical shaft and each having a diametrically enlarged tread, said treads contacting and being relatively movable respectively along said tracks, said elements being operable by reason of said dwell and relief areas at least once during each relative revolution therebetween and each time within a minor portion of said revolution, to effect an axial reciprocation of said shaft member with respect to said supporting member out of normal position comprising first a relief stroke followed by a return stroke through a small fraction of an inch to effect termination of a chip being formed by the drill when cutting.

5. A device according to claim 4 in which each of the rollers is formed with the enlarged tread on one end portion, and is adapted to be reversed end for end, on the diametrical shaft so as to locate the tread selectively for rolling contact with either one of the concentric tracks.

6. A device for drilling machinable material comprising, in combination, a hollow supporting casing adapted to be mounted for cutting feed movement and to be constrained against rotation and comprising two opposite end sections removably secured together, a driven shaft member journalled in and projecting from one end of said supporting casing and being adapted for connection for rotary power drive and for limited independent axial movement relative to said supporting casing, said shaft member being adapted to support a fluted drill at the outer end in coaxial relation thereto and for rotary and axial movement therewith, and relatively revoluble coacting cam and cam follower elements for normally sustaining said shaft member against the axial drilling thrust, the cam element comprising a flat annular cam plate having on one side face a track formed with alternating dwell and relief areas and extending concentrically about said shaft member, said plate being rigidly clamped in position between said casing sections, the follower element being supported from said shaft member in opposed relation to said cam element, and being operatively connected to said shaft member for rotary drive therefrom, said elements being operable by reason of said dwell and relief areas at least once during each relative revolution therebetween and each time within a minor portion of said revolution, to effect an axial reciprocation of said shaft member with respect to said supporting casing out of normal position comprising first a relief stroke followed by a return stroke through a small fraction of an inch to effect termination of a chip being formed by the drill when cutting.

7. A device according to claim 6 in which the cam plate also has on the other side face a track extending concentrically about the shaft member and formed with alternating dwell and relief areas, said last mentioned dwell and relief areas differing dimensionally from the dwell and relief areas on the opposite side face of the plate, and in which the cam plate is reversible between the casing sections, whereby to locate either side face of the cam plate selectively in operative position for coaction with the follower element.

8. A device for drilling machinable material comprising, in combination, a supporting member adapted to be mounted for cutting feed movement and to be constrained against rotation, a driven shaft member disposed on an axis projecting through said supporting member and adapted to be connected for rotary power drive and for limited independent axial movement relative to said supporting member, said shaft member being adapted to support a fluted drill at one end in coaxial relation thereto and for rotary and axial movement therewith, and relatively revoluble coacting cam and cam follower elements for normally sustaining said shaft member against the axial drilling thrust, one of said elements being carried by said supporting member in fixed axial position relative thereto, the other of said elements being supported from said shaft member in opposed relation to said one element, and being operatively connected to said shaft member for rotary drive therefrom, said cam element comprising a flat annular cam plate having two cam tracks respectively on opposite side faces and extending concentrically about the shaft member, each track being formed with alternating dwell and relief areas, said cam plate being reversible side for side selectively to locate either cam track in operative position for coaction with the follower element, said elements being operable by reason of the dwell and relief areas of either track at least once during each relative revolution therebetween and each time within a minor portion of said revolution, to effect an axial reciprocation of said shaft member with respect to said supporting member out of normal position comprising first a relief stroke followed by a return stroke through a small fraction of an inch to effect termination of a chip being formed by the drill when cutting.

9. A device for drilling machinable material comprising, in combination, a supporting member adapted to be mounted for cutting feed movement and to be constrained against rotation, a driven shaft member disposed on an axis projecting through said supporting member and adapted to be connected for rotary power drive and for limited independent axial movement relative to said supporting member, said shaft member being adapted to support a fluted drill at one end in coaxial relation thereto and for rotary and axial movement therewith, and relatively revoluble coacting cam and cam follower elements for normally sustaining said shaft member against the axial drilling thrust, one of said elements being carried by said supporting member in fixed axial position relative thereto, the other of said elements being supported from said shaft member in opposed relation to said one element, and being operatively connected to said shaft member for rotary drive therefrom, said cam element defining two circular tracks extending concentrically about said axis each formed with alternating dwell and relief areas, said follower element comprising two rollers, each having a diametrically enlarged tread on one end portion and contacting and relatively movable respectively along said tracks, each roller being reversible in position end for end so as to locate its tread selectively for rolling contact with either one of said tracks, said elements being operable by reason of said dwell and relief areas at least once during each relative revolution therebetween and each time within a minor portion of said revolution, to effect an axial reciprocation of said shaft member with respect to axial supporting member out of normal position comprising first a relief stroke followed by a return stroke through a small fraction of an inch to effect termination of a chip being formed by the drill when cutting.

10. A device for drilling metal and the like comprising, in combination, a hollow casing having opposite end sections connected together, and adapted to be supported for axial feed movement and to be constrained against rotation, an annular cam disk rigidly clamped coaxially between said sections and having an end cam face formed into two concentric radially spaced cam tracks, each with a flat arcuate depression therein extending over a minor portion of the circumference, the depressions of said tracks being diametrically oppositely disposed and each extending through the same angular degree, a drive shaft extending from one end of said casing through and journalled in anti-friction bearings in said end sections and extending axially through said disk, a driven shaft extending from the other end of said casing telescopically into said drive shaft for relatively axial shifting movement, a diametrical shaft extending through and fixed in said driven shaft, said driven shaft being formed with longitudinal spline slots in its wall at diametrically opposite sides and the opposite ends of said diametrical shaft projecting slidably through said slots, two cam follower rollers removably mounted respectively for rotation on opposite ends of said diametrical shaft in position for rolling contact respectively with said tracks, and coiled compression spring means encircling said drive shaft and seated in said casing and acting on said diametrical shaft in a direction to urge said driven shaft inwardly and to maintain said rollers in contact with said tracks, each of said rollers having a diametrically raised tread on one end portion, and being reversible end for end to locate said tread selectively in registration with one or the other of said tracks, whereby upon each revolution of said rollers, said driven shaft is caused to reciprocate axially in an inward retract movement and outward return movement within a minor portion of said revolution through a distance determined by the depth of said depressions sufficiently to terminate the chips being formed by the drill when drilling.

11. A drilling assembly for use in the art of metal drilling comprising a housing, a driven shaft journalled in the housing, a cam device including a member having two concentric paths thereon each with a single relief occupying an arc of approximately 60°, a follower device cooperating with said cam device and including a rotor for each path having a flange thereon, said rotors being located at diametrically opposite positions and at different radial distances from the axis of rotation of the driven shaft, one of said devices being carried by the housing, and the other of said devices being carried by the driven shaft, means for inducing a constant engagement between said devices, and means for mounting a drill upon the outer end of said driven shaft in operative position, said devices cooperating with each other to impart to the drill a retractive reciprocation once each revolution of the drill to comminute the chips formed by the drill.

JOHN W. KARWEIT.

REFERENCES CITED

The following references are of record in the file of this patent:

UNITED STATES PATENTS

| Number | Name | Date |
| --- | --- | --- |
| 463,973 | Palmer | Nov. 24, 1891 |
| 1,523,629 | Bullock | Jan. 20, 1925 |
| 2,105,762 | Zimmerman | Jan. 18, 1938 |
| 2,242,781 | Gideon | May 20, 1941 |
| 2,328,542 | Bates | Sept. 7, 1943 |

FOREIGN PATENTS

| Number | Country | Date |
| --- | --- | --- |
| 422,829 | Great Britain | Jan. 18, 1935 |
| 55,472 | Germany | Feb. 28, 1891 |